(12) United States Patent
Bhattacharya et al.

(10) Patent No.: US 12,481,813 B2
(45) Date of Patent: Nov. 25, 2025

(54) TEST POINT INSERTION IN ANALOG CIRCUIT DESIGN TESTING

(71) Applicant: Synopsys, Inc., Mountain View, CA (US)

(72) Inventors: Mayukh Bhattacharya, Palo Alto, CA (US); Peilin Jiang, SAnta Clara, CA (US)

(73) Assignee: Synopsys, Inc., Sunnyvale, CA (US)

( * ) Notice: Subject to any disclaimer, the term of this patent is extended or adjusted under 35 U.S.C. 154(b) by 571 days.

(21) Appl. No.: 18/094,951

(22) Filed: Jan. 9, 2023

(65) Prior Publication Data
US 2024/0232485 A1 Jul. 11, 2024

(51) Int. Cl.
*G06F 30/3308* (2020.01)
*G06F 30/20* (2020.01)
*G06F 30/367* (2020.01)
*G06F 30/398* (2020.01)
G06F 11/00 (2006.01)
G06F 11/26 (2006.01)

(52) U.S. Cl.
CPC ........ *G06F 30/3308* (2020.01); *G06F 11/008* (2013.01); *G06F 11/261* (2013.01); *G06F 30/20* (2020.01); *G06F 30/367* (2020.01); *G06F 30/398* (2020.01)

(58) Field of Classification Search
CPC .... G06F 30/3308; G06F 30/20; G06F 30/367; G06F 30/398; G06F 11/008; G06F 11/261
USPC ..... 716/136, 106, 112; 703/16; 714/33, 732, 714/741
See application file for complete search history.

(56) References Cited

U.S. PATENT DOCUMENTS

| | | | | |
|---|---|---|---|---|
| 5,931,963 | A * | 8/1999 | Tani ................... | G01R 31/2621 714/724 |
| 11,740,284 | B1 * | 8/2023 | Chokhani .......... | G01R 31/3177 716/136 |
| 11,810,365 | B1 * | 11/2023 | Crego .................... | G06V 20/58 |
| 11,892,501 | B1 * | 2/2024 | Chokhani .......... | G01R 31/2879 |
| 12,332,301 | B2 * | 6/2025 | Bhattacharya ..... | G01R 31/2848 |

(Continued)

FOREIGN PATENT DOCUMENTS

| | | | | |
|---|---|---|---|---|
| DE | 2329610 | A1 * | 1/1974 | ............. G06F 30/33 |
| DE | 102004058753 | A1 * | 10/2005 | ..... G01R 31/318357 |

OTHER PUBLICATIONS

Binu et al., "A survey on fault diagnosis of analog cicuits: Taxonomy and stae of the art", International Journal of Electronics and Communications, 2017, pp. 68-83. (Year: 2017).*

*Primary Examiner* — Phallaka Kik
(74) *Attorney, Agent, or Firm* — Patterson + Sheridan, LLP

(57) ABSTRACT

A system and method for inserting test points during circuit design testing are presented. The method includes partitioning a circuit design into a plurality of blocks and determining a first potential defect and a second potential defect for the circuit design. The method also includes simulating the circuit design by injecting, into the circuit design, the first potential defect to produce a first set of outputs of the plurality of blocks and simulating the circuit design by injecting, into the circuit design, the second potential defect to produce a second set of outputs of the plurality of blocks. The method further includes determining a set of output nodes of the plurality of blocks and generating a test that, when executed, measures signals at the set of output nodes.

20 Claims, 6 Drawing Sheets

(56) References Cited

U.S. PATENT DOCUMENTS

| | | | |
|---|---|---|---|
| 2003/0115562 A1* | 6/2003 | Martin | G06F 30/33 |
| | | | 716/107 |
| 2005/0229121 A1* | 10/2005 | Hildebrant | G01R 31/318357 |
| | | | 716/112 |
| 2008/0301596 A1* | 12/2008 | Kneisel | G01R 31/3171 |
| | | | 716/136 |
| 2015/0293827 A1* | 10/2015 | Han | G06F 11/2215 |
| | | | 714/41 |
| 2021/0312113 A1* | 10/2021 | Bhattacharya | G06F 30/3323 |
| 2024/0061035 A1* | 2/2024 | Bhattacharya | G06F 30/3323 |
| 2024/0184967 A1* | 6/2024 | Arad | G06F 30/347 |

* cited by examiner

TEST POINT INSERTION IN ANALOG CIRCUIT DESIGN TESTING

TECHNICAL FIELD

The present disclosure relates to electronic circuit design simulation and testing.

BACKGROUND

Electronic circuit designs may be tested and verified at multiple stages of the design process. Some tests may send signals through portions of the circuit design and analyze the output of the circuit design to see if the circuit design includes certain defects (e.g., short circuits, open circuits, electrostatic discharge, etc.).

SUMMARY

A system and method for inserting test points during circuit design testing are presented. According to an embodiment, a method for generating a circuit design test includes partitioning a circuit design into a plurality of blocks and determining a first potential defect and a second potential defect for the circuit design. The method also includes simulating the circuit design by injecting, into the circuit design, the first potential defect to produce a first set of outputs of the plurality of blocks and simulating the circuit design by injecting, into the circuit design, the second potential defect to produce a second set of outputs of the plurality of blocks. The method further includes determining, by a processor and based at least in part on the first set of outputs of the plurality of blocks and the second set of outputs of the plurality of blocks, a set of output nodes of the plurality of blocks and generating a test that, when executed, measures signals at the set of output nodes.

Partitioning the circuit design into a plurality of blocks may include identifying a plurality of power-nets in the circuit design and disconnecting the circuit design at a portion of the plurality of power-nets to form the plurality of blocks.

The method may include simulating the circuit design to produce a plurality of waveforms at output nodes of the plurality of blocks. Determining the set of output nodes may include determining a first difference between (i) an output of the first set of outputs at an output node of a block of the plurality of blocks and (ii) a waveform of the plurality of waveforms at the output node and determining a second difference between (i) an output of the second set of outputs of at the output node and (ii) the waveform of the plurality of waveforms at the output node. Determining the first difference between the output of the first set of outputs and the waveform may include subtracting values of the output at a plurality of timepoints from corresponding values of the waveform at the plurality of timepoints to produce a plurality of difference points and integrating the plurality of difference points over time. The method may include determining a timepoint of the plurality of timepoints when a difference point of the plurality of difference points exceeds a threshold. The test, when executed, may measure the signals at the set of output nodes according to the determined timepoint. Determining the set of output nodes may include adding the output node to the set of output nodes in response to determining that the first difference and the second difference exceed a threshold.

According to another embodiment, a system for generating a circuit design test includes a memory and a processor communicatively coupled to the memory. The processor partitions a circuit design into a plurality of blocks and determines a first potential defect and a second potential defect for the circuit design. The processor also simulates the circuit design by injecting, into the circuit design, the first potential defect to produce a first set of outputs of the plurality of blocks and simulates the circuit design by injecting, into the circuit design, the second potential defect to produce a second set of outputs of the plurality of blocks. The processor further determines, based at least in part on the first set of outputs of the plurality of blocks and the second set of outputs of the plurality of blocks, a set of output nodes of the plurality of blocks and generates a test that, when executed, measures signals at the set of output nodes.

Partitioning the circuit design into a plurality of blocks may include identifying a plurality of power-nets in the circuit design and disconnecting the circuit design at a portion of the plurality of power-nets to form the plurality of blocks.

The processor may simulate the circuit design to produce a plurality of waveforms at output nodes of the plurality of blocks. Determining the set of output nodes may include determining a first difference between (i) an output of the first set of outputs at an output node of a block of the plurality of blocks and (ii) a waveform of the plurality of waveforms at the output node and determining a second difference between (i) an output of the second set of outputs of at the output node and (ii) the waveform of the plurality of waveforms at the output node. Determining the first difference between the output of the first set of outputs and the waveform may include subtracting values of the output at a plurality of timepoints from corresponding values of the waveform at the plurality of timepoints to produce a plurality of difference points and integrating the plurality of difference points over time. The processor may determine a timepoint of the plurality of timepoints when a difference point of the plurality of difference points exceeds a threshold. The test, when executed, may measure the signals at the set of output nodes according to the determined timepoint. Determining the set of output nodes may include adding the output node to the set of output nodes in response to determining that the first difference and the second difference exceed a threshold.

According to another embodiment, a non-transitory computer readable medium stores instructions for generating a circuit design test that, when executed by a processor, cause the processor to partition a circuit design into a plurality of blocks and simulate the circuit design to produce a plurality of waveforms at output nodes of the plurality of blocks. The processor also simulates the circuit design by injecting, into the circuit design, a potential defect to produce a set of outputs of the plurality of blocks and determines, based at least in part on differences between the set of outputs of the plurality of blocks and the plurality of waveforms, a set of output nodes of the plurality of blocks. The processor further generates a test that, when executed, measures signals at the set of output nodes.

Partitioning the circuit design into a plurality of blocks may include identifying a plurality of power-nets in the circuit design and disconnecting the circuit design at a portion of the plurality of power-nets to form the plurality of blocks.

Determining the set of output nodes may include determining a difference between (i) an output of the set of outputs at an output node of a block of the plurality of blocks and (ii) a waveform of the plurality of waveforms at the output node. Determining the difference between the output of the set of outputs and the waveform may include subtracting values of the output at a plurality of timepoints from corresponding values of the waveform at the plurality of timepoints to produce a plurality of difference points and integrating the plurality of difference points over time. The processor may determine a timepoint of the plurality of timepoints when a difference point of the plurality of difference points exceeds a threshold. The test, when executed, may measure the signals at the set of output nodes according to the determined timepoint. Determining the set of output nodes may include adding the output node to the set of output nodes in response to determining that the difference exceeds a threshold.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
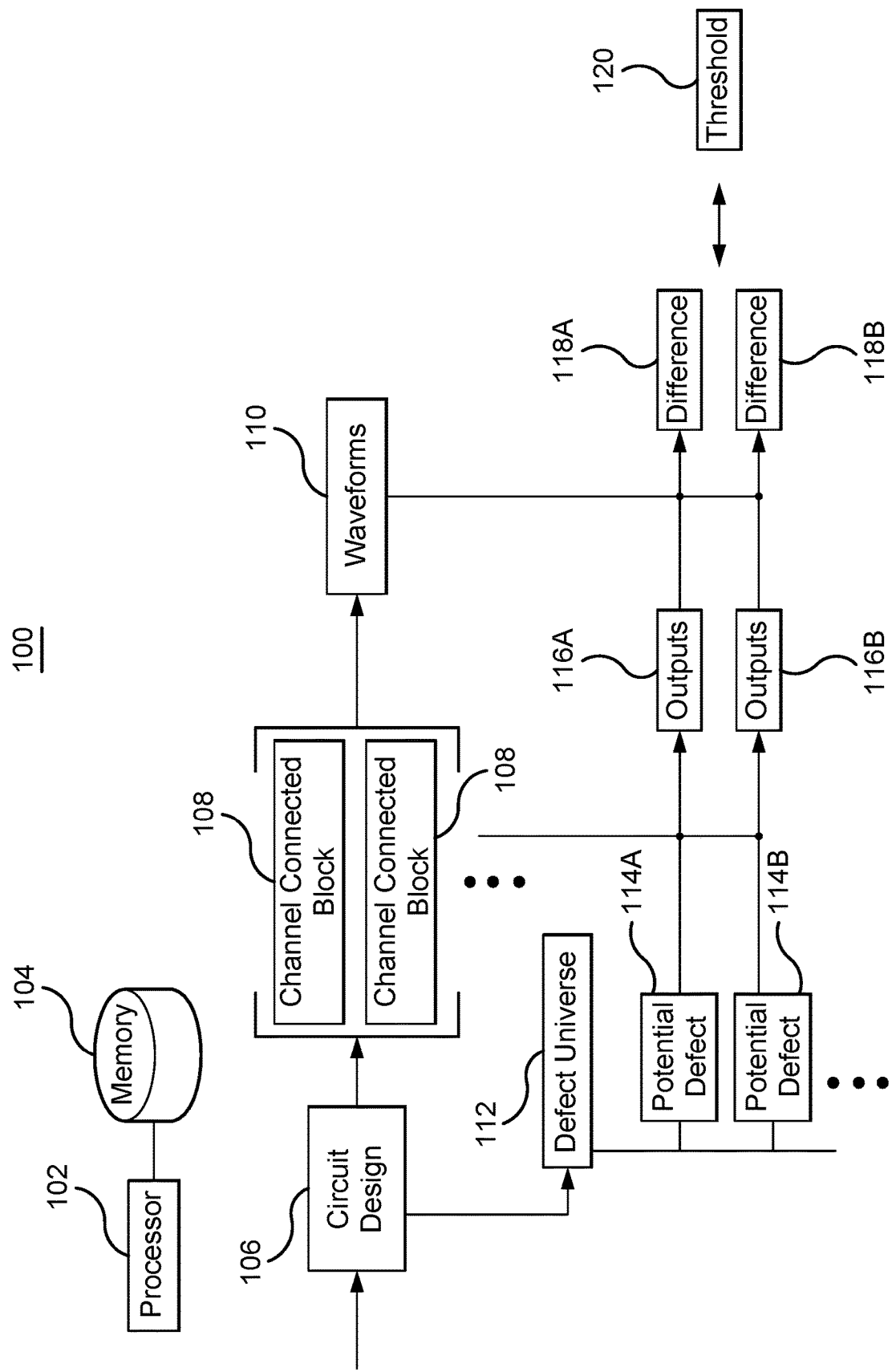
FIG. 1 illustrates an example system partitioning a circuit design and determining differences in outputs of channel connected blocks.

Aspects of the present disclosure relate to circuit design testing using channel connected blocks. Electronic circuit designs may be tested and verified at multiple stages of the design process to detect defects (e.g., short circuits, open circuits, electrostatic discharge, etc.) within the circuit design. Analog circuits and mixed signal circuits (e.g., circuits that use digital and analog circuitry) are more difficult to test than digital circuits for several reasons. First, analog circuits are presented at transistor level in the form of a netlist, which may or may not have sub-circuit or submodule definitions, and hence it may be very different from logic-gate-based modular digital design. Second, the signals in the circuit may not be represented by mere trains of 0, 1, X (unknown), and Z (high-impedance) signals, but by real-number time-series waveforms. Hence, algorithms which take advantage of the digital nature of the signals do not work for analog circuits generally. Third, in digital circuits, the nodes to be tested typically are the outputs of various logic gates, but in analog circuits presented using transistor-level netlists, the selection of test points may consider all nodes in the circuit, many of which may be difficult to access.

As a result of these difficulties, a test suite for analog circuits or mixed signal circuits may be incomplete in the sense that the test suite may leave certain defects in the circuits undetected, which may result in failure when the circuits are installed (e.g., in automobiles). It has been observed in some studies that 80% of circuit failures are attributed to analog portions of the circuits. Thus, it is desirable to expand test suites to cover or detect as many potential defects as possible. The challenge to expanding the test suite, however, is determining which nodes of the circuits should be tested to detect the previously undetected defects.

The present disclosure describes a system for determining the nodes of the circuits to be tested using channel connected blocks (e.g., groups of devices in the circuit design that are connected through low-impedance terminals). The system partitions a circuit design into channel connected blocks and then restricts the nodal space to the outputs of the channel connected blocks. The system also determines the potential defects that could occur in the circuit design. The system simulates the circuit design with no injected defects to produce waveforms for the outputs of the channel connected blocks. The system also simulates the circuit design once for each potential defect injected to produce sets of outputs of the channel connected blocks. For potential defects that are not covered or not detected by a test suite, the system may determine differences between the sets of outputs for those potential defects and the waveforms. For differences that are large (e.g., exceed a threshold), the system may determine that these differences can be easily detected and add the output nodes of the channel connected blocks that produced these differences to a list of potential test nodes. The system analyzes the list of potential test nodes to determine the set of output nodes that maximize coverage for the not covered or undetected defects. The system may then generate a test that measures signals at the set of output nodes to expand coverage for the not covered or undetected defects.

Technical advantages of the present disclosure include, but are not limited to, reducing the amount of time it takes to expand test coverage for analog circuits or mixed signal circuits. Generally, the system described herein analyzes the responses of channel connected blocks, which reduces the number of candidate nodes to consider when designing tests. Existing system may consider every node in a circuit design when designing a test, which may be a slow process. By using channel connected blocks and limiting the analysis to the outputs of the channel connected blocks, the present system may expand test coverage more quickly relative to existing system, in certain embodiments. Additionally, the system may improve test coverage by determining the candidate nodes that allow for detection of the most number of undetected defects. Tests may then be designed to measure signals at these candidate nodes so that additional defects may be detected.

FIG. 1 illustrates an example system 100. Generally, the system 100 is a computer system, such as the computer 600 shown in FIG. 6. As seen in FIG. 1, the computer system includes a processor 102 and a memory 104 that perform the actions and functions of the system 100 described herein. The computer system may partition a circuit design 106 into channel connected blocks 108 and may determine differences in outputs of the channel connected blocks 108.

The processor 102 is any electronic circuitry, including, but not limited to one or a combination of microprocessors, microcontrollers, application specific integrated circuits (ASIC), application specific instruction set processor (ASIP), and/or state machines, that communicatively couples to memory 104 and controls the operation of the computer system. The processor 102 may be 8-bit, 16-bit, 32-bit, 64-bit or of any other suitable architecture. The processor 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 102 may include other hardware that operates software to control and process information. The processor 102 executes software stored on the memory 104 to perform any of the functions described herein. The processor 102 controls the operation and administration of the computer system by processing information (e.g., information received from the memory 104). The processor 102 is not limited to a single processing device and may encompass multiple processing devices.

The memory 104 may store, either permanently or temporarily, data, operational software, or other information for the processor 102. The memory 104 may include any one or a combination of volatile or non-volatile local or remote devices suitable for storing information. For example, the memory 104 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 104, a disk, a CD, or a flash drive. In particular embodiments, the software may include an application executable by the processor 102 to perform one or more of the functions described herein.

The computer system receives a circuit design 106. The circuit design 106 may include a netlist that describes the connectivity for the circuit design. For example, the netlist may identify the components of the circuit design 106 and the nodes to which they are connected. The netlist may be read into a circuit database with this device connectivity information. The computer system may parse the netlist to determine the circuit components in the circuit design 106 and how these components are connected.

The computer system may divide the circuit design 106 into channel connected blocks 108. First, the computer system analyzes the circuit graph for the circuit design 106 to identify power-nets. The circuit graph is a graphical representation of the circuit design 106 and may be generated from the netlist. Nodes of the circuit graph may represent components of the circuit design 106, and edges of the circuit graph may represent connections between the components in the circuit design 106. As a result, two nodes in the circuit graph are connected by an edge if the circuit components represented by the nodes are electrically connected in the circuit design 106. The computer system may analyze the circuit graph to identify features that are indicative of power nets. For instance, signals that touch many transistor channels or bulk terminals of MOSFETs are potential power nets.

Second, sub-graph isomorphism is used to identify arrays of such repetitive structures as memory cells or other elements. Nets which touch the high-impedance gate ports of many devices in such arrays are considered "word-lines," and the nets which were earlier thought of as power nets but touch certain MOSFET channels of some of the cells only are considered to be "bit-lines" (these are no longer considered as power nets).

Third, the circuit graph is disconnected at the power nets and bit lines (if any) and at the high-impedance terminals of all devices. This process causes the entire circuit netlist to be partitioned into channel-connected device connections. That is, two devices remain in the same partition if and only if they are connected through low-impedance terminals (in the case of MOSFETS, the Gate terminal has high-impedance, and the other terminals are low-impedance in nature) unless the low-impedance terminals happen to touch a power net or a bit line. Each of the partitions of devices that are connected through low-impedance terminals is referred to as a channel connected block 108. The computer system may then identify the input nodes and output nodes of each channel connected block 108.

The computer system may then add probes to the output nodes of the channel connected blocks 108. The computer system may add probes to the output nodes of each channel connected block 108 so that the signals at the output nodes may be read, analyzed, and stored. The output nodes may be nodes which belong to a channel connected block 108 but also touch a high impedance port of another device (e.g., gates of MOSFETs) in another channel connected block 108. Additionally, the output nodes may include primary output nodes of the circuit design 106.

The computer system runs a nominal (e.g., defect-free) simulation of the full circuit and saves the waveforms 110 of the signals at the output nodes of the channel connected blocks 108. This simulation creates baseline output waveforms 110 for the probed output nodes of the channel connected blocks 108.

The computer system also generates the defect universe 112 for the circuit design 106, which may be referred to as the "defect compilation" process, where all potential defects 114 in the circuit design 106 may be determined. The list of potential defects 114 is known as the defect universe 112 of the circuit design 106. The computer system may analyze the circuit components and the connectivity information determined by parsing the netlist to determine the locations where potential defects 114 (e.g., open circuits, short circuits, abnormal variations in various device parameters such as threshold voltage of a MOSFET or resistance value of a resistor, etc.) may be injected into the circuit design 106. Each location and the type of defect that may be injected at that location may be stored in the list of defects. In this disclosure, it is understood that a defect in the defect universe 112 is a potential defect 114 that may occur in the circuit design 106 and not necessarily a defect that is actually occurring in the circuit design 106. As seen in FIG. 1, the defect universe 112 includes a potential defect 114A and a potential defect 114B.

The computer system may then simulate the circuit design 106 by injecting the potential defects 114 into the circuit design 106. For example, the computer system may inject a potential defect 114 into the circuit design 106 and then simulate the circuit design 106 with the injected defect. During each simulation, the computer system may track and store the outputs 116 at the output nodes of the channel connected blocks 108. The computer system may repeat this process for each potential defect 114.

In some embodiments, during simulation, the computer system may determine the potential defects 114 in the defect universe 112 that are not detected by an existing test suite. For example, the computer system may execute a test from the test suite against the circuit design 106 and determine the potential defects 114 from the defect universe 112 for which the test does not check or detect. These potential defects 114 may be referred to as not-covered (NC) defects. In the example of FIG. 1, the potential defects 114A and 114B may be NC defects. The computer system simulates the circuit design 106 by injecting the potential defect 114A to produce the outputs 116A and by injecting the potential defect 114B to produce the outputs 116B.

In certain embodiments, the defect universe 112 may be large and the computer system may not efficiently simulate the circuit design by injecting the entire defect universe 112. Instead, the computer system may simulate a subset or sample of defects drawn from the defect universe 112 that produces an acceptable error bound (e.g., confidence interval in case of random sampling). The objective may be to obtain as large a sample of NC defects as possible.

The computer system then determines differences 118 between the outputs 116 for the NC defects and the waveforms 110 that were generated by simulating the circuit design 106 without injecting any defects. In some embodiments, the computer system may determine the differences 118 by subtracting the outputs 116 and the waveforms 110 at particular time points. For example, the computer system may determine a set of time points and determine the values of the outputs 116 and the values of the waveforms 110 at those time points. The computer system may then add a margin (e.g., a user-defined value such as +5% or +10%) to the baseline waveforms 110. The computer system may then subtract the values of the outputs 116 at the time points and the corresponding values of the waveforms 110 at those time points. In this manner, the computer system produces a series of difference points for the outputs 116 of each potential defect 114. The computer system may then integrate the series of difference points for a potential defect 114 over time to produce a total difference, which the computer system may use as the difference 118 for the potential defect 114. In certain embodiments, the computer system divides the total difference by the total transient time of the simulation, outputs 116, or waveforms 110 and uses the result as the difference 118 for the potential defect 114. In the example of FIG. 1, the computer system determines the difference 118A for the potential defect 114A and the difference 118B for the potential defect 114B.

For some signals (e.g., an output of a phase-locked loop circuit or other oscillatory signals), the signals may be converted from voltage-versus-time to frequency-versus-time before computing the difference 118. For such signals, the variation of frequency over time may be more informative than the variation of voltage over time.

The computer system then compares the differences 118 to a threshold 120. A user of the computer system may set the threshold 120. In some embodiments, the computer system identifies the differences 118 that exceed the threshold 120. These differences 118 are considered to be large enough that a test can detect the potential defect 114. Stated differently, the output 116 and the waveform 110 may deviate sufficiently from each other so as to reveal the potential defect 114. If a difference 118 does not exceed the threshold 120, then it may mean that the output 116 and the waveform 110 are too similar that the potential defect 114 may not be detected by comparing the output 116 to the waveform 110.

Figure 2:
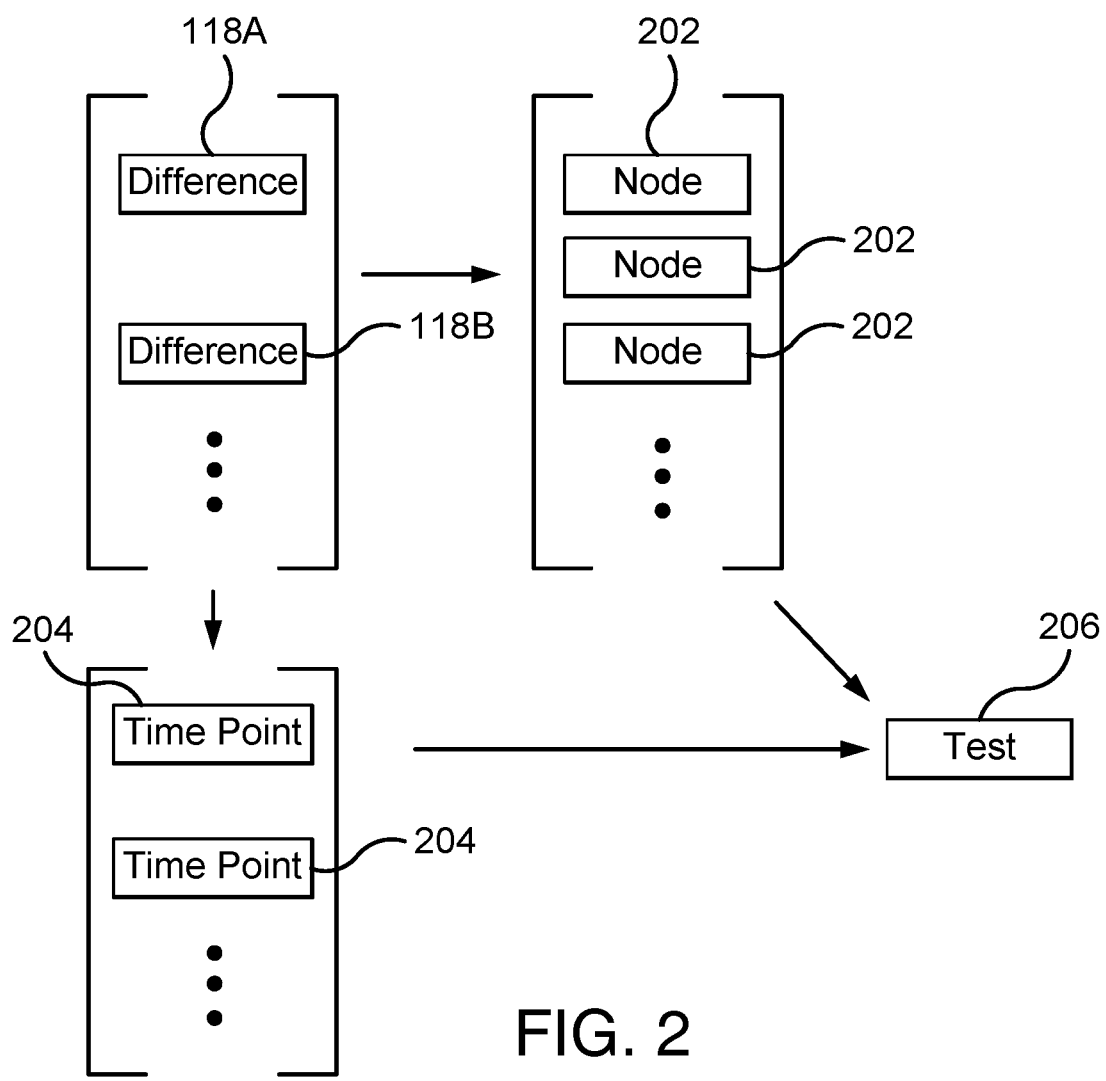
FIG. 2 illustrates the example system of FIG. 1 generating a test using the differences in outputs of the channel connected blocks.
Figure 6:
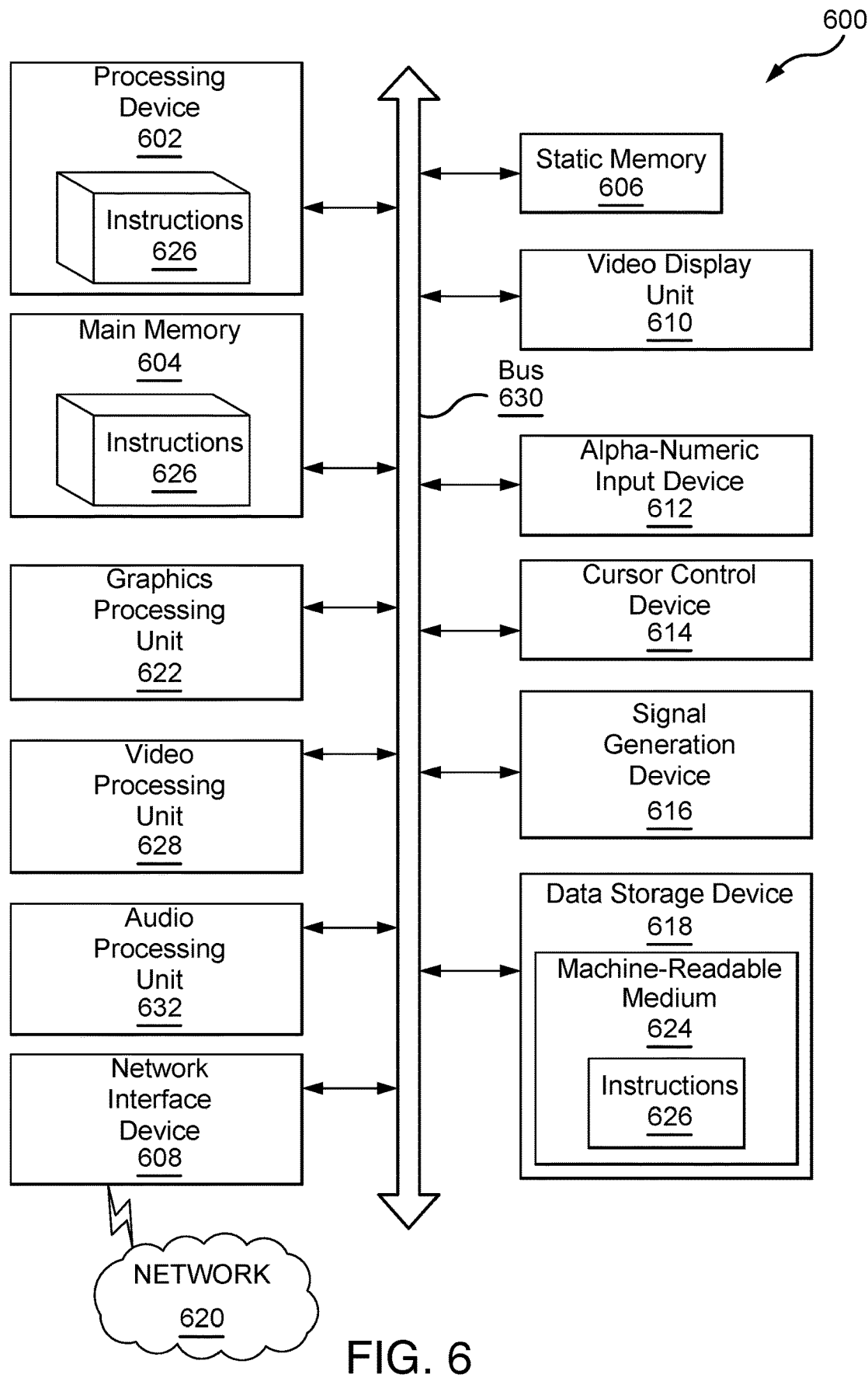
FIG. 6 depicts a diagram of an example computer system in which embodiments of the present disclosure may operate.

FIG. 2 illustrates the example system 100 of FIG. 1 (which may be a computer system, such as the computer system 600 of FIG. 6) generating a test 206 using the differences 118 in outputs of the channel connected blocks. The computer system may begin with the set of differences 118 that exceeded the threshold 120. In certain embodiments, the computer system may use the differences 118 for the outputs 116 that exceed the threshold 120 and discard the differences 118 for the outputs 116 that do not exceed the threshold 120. For example, for a particular potential defect 114, the outputs 116 may include ten output signals of ten output nodes of the channel connected blocks 108. The computer system may determine differences 118 between each of these output signals and the corresponding waveform 110 for the output nodes. If a difference 118 exceeds the threshold 120, then the computer system may keep that difference 118. If the difference 118 does not exceed the threshold 120, then the computer system may not further consider the output signal for that output node.

In the example of FIG. 2, the computer system begins with the differences 118A and 118B for the potential defects 114A and 114B, which may have been determined to be NC defects. The difference 118A includes the set of differences between the output signals at the output nodes of the channel connected blocks 108 and the corresponding waveforms 110 at the output nodes of the channel connected blocks 108. The difference 118B includes the set of differences between the output signals at the output nodes of the channel connected blocks 108 and the corresponding waveforms 110 at the output nodes of the channel connected blocks 108. The computer system may discard, from the difference 118A, the differences that do not exceed the threshold 120, and the computer system may discard, from the difference 118B, the differences that do not exceed the threshold 120.

The computer system may then determine a set of output nodes 202 of the channel connected blocks 108 that are common to the remaining differences in the difference 118A and the difference 118B. In some embodiments, the computer system determines the set of differences remaining in the differences 118A and 118B. The computer system also determines the output nodes of the channel connected blocks 108 that produced the remaining set of differences. The computer system may add the output nodes of the channel connected blocks 108 that are common to both the difference 118A and the difference 118B to the set of output nodes 202. This set of output nodes 202 may be the minimum set of output nodes 202 needed to cover the previously NC defects. Thus, by measuring and analyzing the signals at the set of output nodes 202, the computer system may detect the NC defects.

In certain embodiments, the computer system orders the set of output nodes 202 by their impact on test coverage. For example, an output node 202 impacted by the most number of NC defects may be ranked first. An output node 202 impacted by few NC defects may be ranked lower. After the set of output nodes 202 is ordered, the computer system may select a subset of the output nodes 202 to be measured by the test 206. For example, the computer system may use a meta-heuristic algorithm to determine the subset of the output nodes 202. In this process, the computer system may randomly insert or delete output nodes 202 from subset while evaluating the impact on test coverage of adding or removing the output nodes 202. The computer system may iterate through the output nodes 202 and find the subset of output nodes 202 that maximizes test coverage. Output nodes 202 may be weighted based on the NC defects that impact these output nodes 202. More significant or costly NC defects may be given greater weight, and the output nodes 202 impacted by these NC defects may be given more weight in determining their impact on test coverage. In this manner, the computer system efficiently expands test coverage by testing the fewest number of output nodes 202 that allow for detection of the most number of NC defects.

The computer system then generates a test 206 that measures the signals at the set of output nodes 202. For example, the test may add probes to the set of output nodes 202 of the channel connected blocks 108. When the test is executed, the signals at the set of output nodes 202 may be measured. The measured signals may then be analyzed to determine if a previously NC defect exists in the circuit design. For example, the computer system may compare the measured signals with the baseline waveforms for the set of output nodes 202 to determine if the NC defect exists. In this manner, the computer system determines a set of output nodes 202 of channel connected blocks 108 to measure to expand test coverage to detect previously NC defects.

In some embodiments, the computer system also determines timepoints 204 at which the test 206 should measure the signals at the set of output nodes 202. These timepoints 204 may be the timepoints at which the greatest differences between the outputs 116 and the waveforms 110 were observed. The test 206 may measure the signals at the output nodes 202 at these timepoints 204 to try to capture the signals when they would differ the greatest from the baseline waveforms 110 for the output nodes 202, which makes it easier to detect the previously NC defect. In this manner, the computer system may determine a minimum number of timepoints 204 when the measured signals are expected to deviate the most from the baseline waveforms 110. As a result, the computer system may reduce the amount of measurements while expanding test coverage.

As seen in FIGS. 1 and 2, the computer system expands test coverage (e.g., for an analog circuit or a mixed signal circuit) by reducing the candidate nodes for testing to the output nodes of the channel connected blocks 108. Generally, for analog circuits or mixed signal circuits, if all the nodes in the circuits were candidates for test points, there would be too many candidates to consider when designing the test 206. Additionally, nodes internal to channel connected blocks 108 would be very unlikely to be acceptable as useful test points as they would most likely be inaccessible. In this manner, the computer system may efficiently design a test 206 that expands test coverage to detect previously NC defects.

Figure 3:
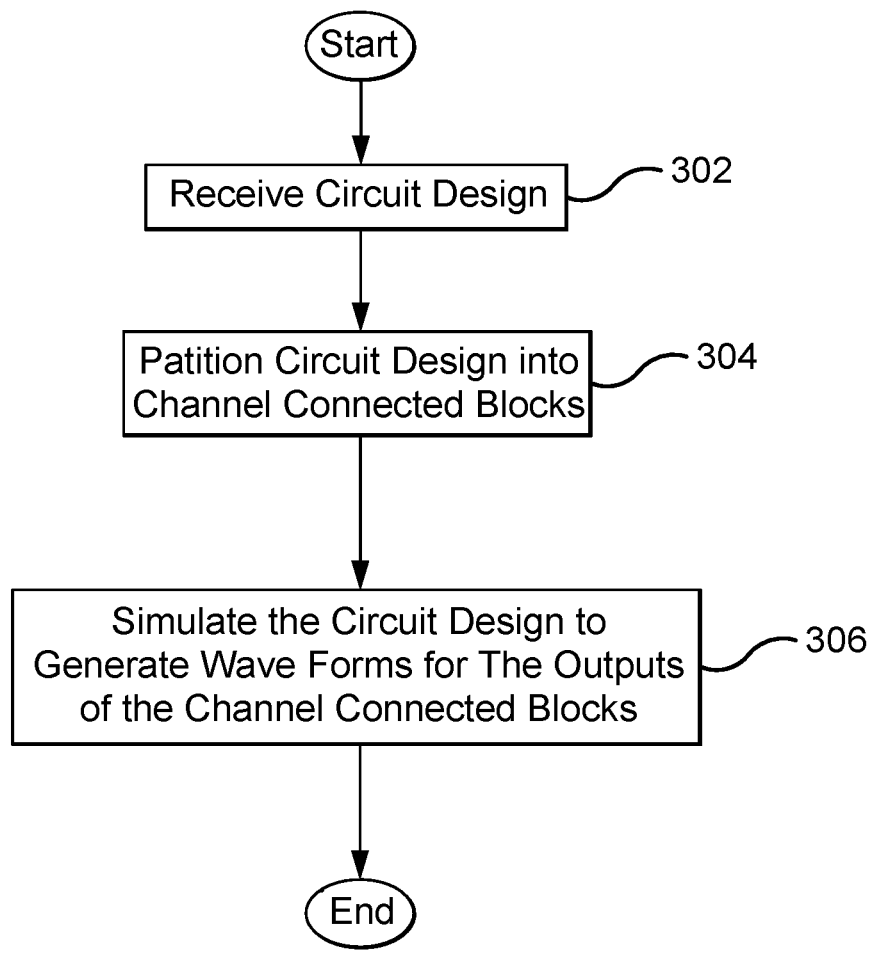
FIG. 3 is a flowchart of an example method performed in the system of FIG. 1.

FIG. 3 is a flowchart of an example method 300 performed in the system of FIG. 1. In particular embodiments, the system 100, which may be a computer system such as the computer system 600 of FIG. 6, performs the method 300. By performing the method 300, the computer system partitions a circuit design 106 into channel connected blocks 108 and generates baseline waveforms 110 for the output nodes of the channel connected blocks 108.

At 302, the computer system receives a circuit design 106. The computer system may receive the circuit design 106 from a user of the computer system, which may indicate the user's desire for the computer system to expand test coverage for the circuit design 106. For example, the user may request the computer system to design a test 206 that detects previously NC defects for the circuit design 106.

At 304, the computer system partitions the circuit design 106 into channel connected blocks 108. The computer system may parse a netlist of the circuit design 106 to determine the circuit components or devices in the circuit design 106 and how they are connected. The computer system may generate a graph with nodes that represent the circuit components or devices and edges that represent the connections. The computer system may disconnect the graph at power nets and bit lines and at the high-impedance terminals of all components or devices, which partitions the circuit designs into channel-connected device connections. The devices in a partition are connected through low-impedance terminals unless the low-impedance terminals touch a power net or bit line. Each of the partitions is a channel connected block 108.

At 306, the computer system simulates the circuit design to generate waveforms 110 for the output nodes of the channel connected blocks 108. The computer system may add probes to the output nodes of the channel connected blocks 108. When the computer system simulates the circuit design 106, the computer system may use the probes to measure the signals and values at the output nodes of the channel connected blocks 108 to produce the waveforms 110. The waveforms 110 are a set of baseline waveforms 110 for the circuit design 106 when no defects are injected into the circuit design.

Figure 4:
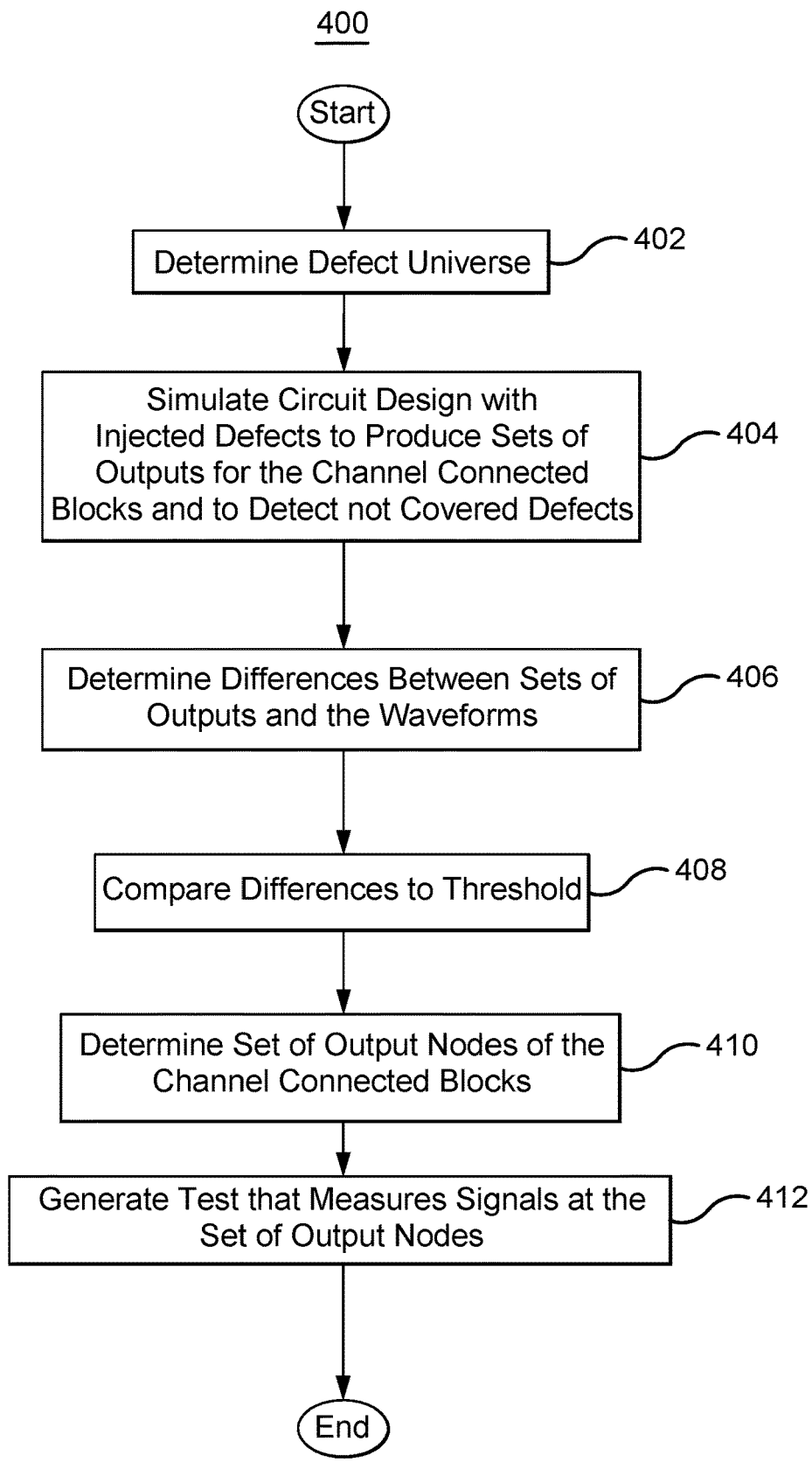
FIG. 4 is a flowchart of an example method performed in the system of FIG. 1.

FIG. 4 is a flowchart of an example method 400 performed in the system of FIG. 1. In particular embodiments, the system 100, which may be a computer system such as the computer system 600 of FIG. 6, performs the method 400. Generally, the computer performs the method 400 after the method 300 of FIG. 3. By performing the method 400, the computer system determines a set of output nodes 202 of the channel connected blocks 108 that cover an NC defect and generates a test 206 that measures signals at the set of output nodes 202.

At 402, the computer system determines a defect universe 112 for the circuit design 106. The computer system may analyze the circuit components and the connectivity information determined by parsing the netlist of the circuit design 106 to determine the locations where potential defects 114 (e.g., open circuits, short circuits, etc.) may be injected into the circuit design 106. Each location and the type of defect that may be injected at that location may be included in the defect universe 112.

In some embodiments, the computer system identifies the potential defects 114 in the defect universe 112 that are NC defects. For example, the computer system may execute an existing test suite to determine which of the potential defects 114 in the defect universe 112 were not detected by the test suite. The computer system may then limit one or more of the subsequent steps of the method 400 to the NC defects in the defect universe 112.

At 404, the computer system simulates the circuit design 106 with injected defects to produce sets of outputs 116 for the channel connected blocks 108. The computer system may inject, into the circuit design 106, each potential defect 114 in the defect universe 112. The computer system may then simulate the circuit design 106 with an injected defect and measure the signals at the output nodes of the channel connected blocks 108 to produce the set of outputs 116 for the injected defect. The computer system may repeat this process for each potential defect 114 in the defect universe 112. In some embodiments, the computer system simulates the circuit design 106 by injecting only the NC defects in the defect universe 112.

At 406, the computer system determines differences 118 between the sets of outputs 116 and the waveforms 110 for the output nodes of the channel connected blocks. The computer system may determine the differences 118 by determining differences between the sets of outputs 116 and the waveforms 110 at particular timepoints to produce sets of difference points. The computer system may then integrate every set of difference points over time to produce sets of total differences. In some embodiments, the computer system also divides the sets of total differences by the total transient time of the simulation to produce the differences 118. Because a set of outputs 116 includes the output signals from the output nodes of the channel connected blocks 108 of the circuit design 106 (with a potential defect injected), the difference 118 for the set of outputs 116 includes the differences between the output signals from the output nodes of the channel connected blocks 108 with the corresponding baseline waveforms 110 of the output nodes of the channel connected blocks 108.

At 408, the computer system compares the differences 118 to a threshold 120. The threshold 120 may be set by a user of the computer system. In some embodiments, for each set of outputs 116, the computer system may discard the output signals in the set of outputs 116 if the differences for those output signals does not exceed the threshold 120. As a result, the set of outputs 116 include the output signals of the channel connected blocks 108 that exceed the threshold 120.

At 410, the computer system determines a set of output nodes 202 of the channel connected blocks 108 using the differences 118 and the sets of outputs 116. As discussed above, the sets of outputs 116 may include the output signals of the output nodes of the channel connected blocks 108 whose differences exceed the threshold 120. The computer system may analyze these output nodes to determine the output nodes that are common to multiple or many of the sets of outputs 116. The computer system may add these output nodes to the set of output nodes 202. In this manner, the computer system creates a set of output nodes 202 that are common to the NC defects. Measuring signals at the set of output nodes 202 may allow the computer system to detect the NC defects.

At 412, the computer system generates the test 206 that measures signals at the set of output nodes 202 of the channel connected blocks 108. When the computer system executes the test 206, the computer system may measure signals at set of output nodes 202. The computer system may then use the measured signals to detect whether an NC defect exists in the circuit design 106. In this manner, the computer system expands test coverage to include the NC defects. Additionally, the computer system may expand test coverage in less time relative to existing systems, because the computer system reduces the universe of test points for consideration to the output nodes of the channel connected blocks 108.

Figure 5:
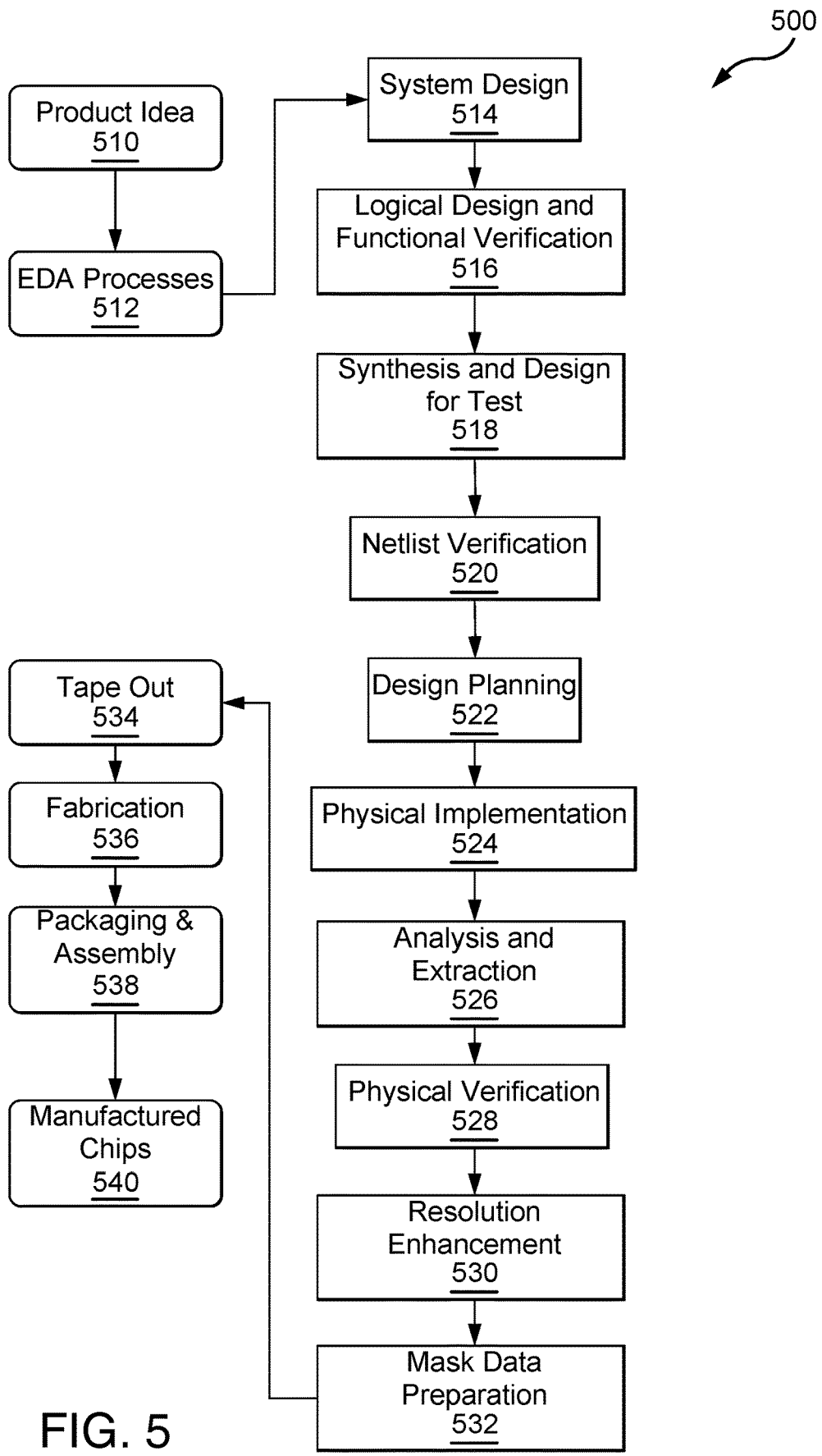
FIG. 5 depicts a flowchart of various processes used during the design and manufacture of an integrated circuit in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 5. The processes described by be enabled by EDA products (or EDA systems).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

FIG. 8 depicts a diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAS, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for generating a circuit design test, the method comprising:
   partitioning a circuit design into a plurality of blocks;
   determining a first potential defect and a second potential defect for the circuit design;
   simulating the circuit design by injecting, into the circuit design, the first potential defect to produce a first set of outputs of the plurality of blocks;
   simulating the circuit design by injecting, into the circuit design, the second potential defect to produce a second set of outputs of the plurality of blocks;
   determining, by a processor and based at least in part on the first set of outputs of the plurality of blocks and the second set of outputs of the plurality of blocks, a set of output nodes of the plurality of blocks; and
   generating a test that, when executed, measures signals at the set of output nodes.

2. The method of claim 1, wherein partitioning the circuit design into a plurality of blocks comprises:
   identifying a plurality of power-nets in the circuit design; and
   disconnecting the circuit design at a portion of the plurality of power-nets to form the plurality of blocks.

3. The method of claim 1, further comprising simulating the circuit design to produce a plurality of waveforms at output nodes of the plurality of blocks.

4. The method of claim 3, wherein determining the set of output nodes comprises:
   determining a first difference between (i) an output of the first set of outputs at an output node of a block of the plurality of blocks and (ii) a waveform of the plurality of waveforms at the output node; and
   determining a second difference between (i) an output of the second set of outputs of at the output node and (ii) the waveform of the plurality of waveforms at the output node.

5. The method of claim 4, wherein determining the first difference between the output of the first set of outputs and the waveform comprises:

subtracting values of the output at a plurality of timepoints from corresponding values of the waveform at the plurality of timepoints to produce a plurality of difference points; and integrating the plurality of difference points over time.

6. The method of claim 5, further comprising determining a timepoint of the plurality of timepoints when a difference point of the plurality of difference points exceeds a threshold, wherein the test, when executed, measures the signals at the set of output nodes according to the determined timepoint.

7. The method of claim 4, wherein determining the set of output nodes further comprises adding the output node to the set of output nodes in response to determining that the first difference and the second difference exceed a threshold.

8. A system for generating a circuit design test, the system comprising:
a memory; and
a processor communicatively coupled to the memory, the processor configured to:
partition a circuit design into a plurality of blocks;
determine a first potential defect and a second potential defect for the circuit design;
simulate the circuit design by injecting, into the circuit design, the first potential defect to produce a first set of outputs of the plurality of blocks;
simulate the circuit design by injecting, into the circuit design, the second potential defect to produce a second set of outputs of the plurality of blocks;
determine, based at least in part on the first set of outputs of the plurality of blocks and the second set of outputs of the plurality of blocks, a set of output nodes of the plurality of blocks; and
generate a test that, when executed, measures signals at the set of output nodes.

9. The system of claim 8, wherein partitioning the circuit design into a plurality of blocks comprises:
identifying a plurality of power-nets in the circuit design; and
disconnecting the circuit design at a portion of the plurality of power-nets to form the plurality of blocks.

10. The system of claim 8, wherein the processor is further configured to simulate the circuit design to produce a plurality of waveforms at output nodes of the plurality of blocks.

11. The system of claim 10, wherein determining the set of output nodes comprises:
determining a first difference between (i) an output of the first set of outputs at an output node of a block of the plurality of blocks and (ii) a waveform of the plurality of waveforms at the output node; and
determining a second difference between (i) an output of the second set of outputs of at the output node and (ii) the waveform of the plurality of waveforms at the output node.

12. The system of claim 11, wherein determining the first difference between the output of the first set of outputs and the waveform comprises:

subtracting values of the output at a plurality of timepoints from corresponding values of the waveform at the plurality of timepoints to produce a plurality of difference points; and
integrating the plurality of difference points over time.

13. The system of claim 12, wherein the processor is further configured to determine a timepoint of the plurality of timepoints when a difference point of the plurality of difference points exceeds a threshold, wherein the test, when executed, measures the signals at the set of output nodes according to the determined timepoint.

14. The system of claim 11, wherein determining the set of output nodes further comprises adding the output node to the set of output nodes in response to determining that the first difference and the second difference exceed a threshold.

15. A non-transitory computer readable medium storing instructions for generating a circuit design test that, when executed by a processor, cause the processor to:
partition a circuit design into a plurality of blocks;
simulate the circuit design to produce a plurality of waveforms at output nodes of the plurality of blocks
simulate the circuit design by injecting, into the circuit design, a potential defect to produce a set of outputs of the plurality of blocks;
determine, based at least in part on differences between the set of outputs of the plurality of blocks and the plurality of waveforms, a set of output nodes of the plurality of blocks; and
generate a test that, when executed, measures signals at the set of output nodes.

16. The medium of claim 15, wherein partitioning the circuit design into a plurality of blocks comprises:
identifying a plurality of power-nets in the circuit design; and
disconnecting the circuit design at a portion of the plurality of power-nets to form the plurality of blocks.

17. The medium of claim 15, wherein determining the set of output nodes comprises determining a difference between (i) an output of the set of outputs at an output node of a block of the plurality of blocks and (ii) a waveform of the plurality of waveforms at the output node.

18. The medium of claim 17, wherein determining the difference between the output of the set of outputs and the waveform comprises:
subtracting values of the output at a plurality of timepoints from corresponding values of the waveform at the plurality of timepoints to produce a plurality of difference points; and
integrating the plurality of difference points over time.

19. The medium of claim 18, wherein the processor further determines a timepoint of the plurality of timepoints when a difference point of the plurality of difference points exceeds a threshold, wherein the test, when executed, measures the signals at the set of output nodes according to the determined timepoint.

20. The medium of claim 17, wherein determining the set of output nodes further comprises adding the output node to the set of output nodes in response to determining that the difference exceeds a threshold.

* * * * *